April 30, 1963
G. K. WARE
3,087,739
ROLLER SKATE STRUCTURE
Filed April 18, 1961
2 Sheets-Sheet 1
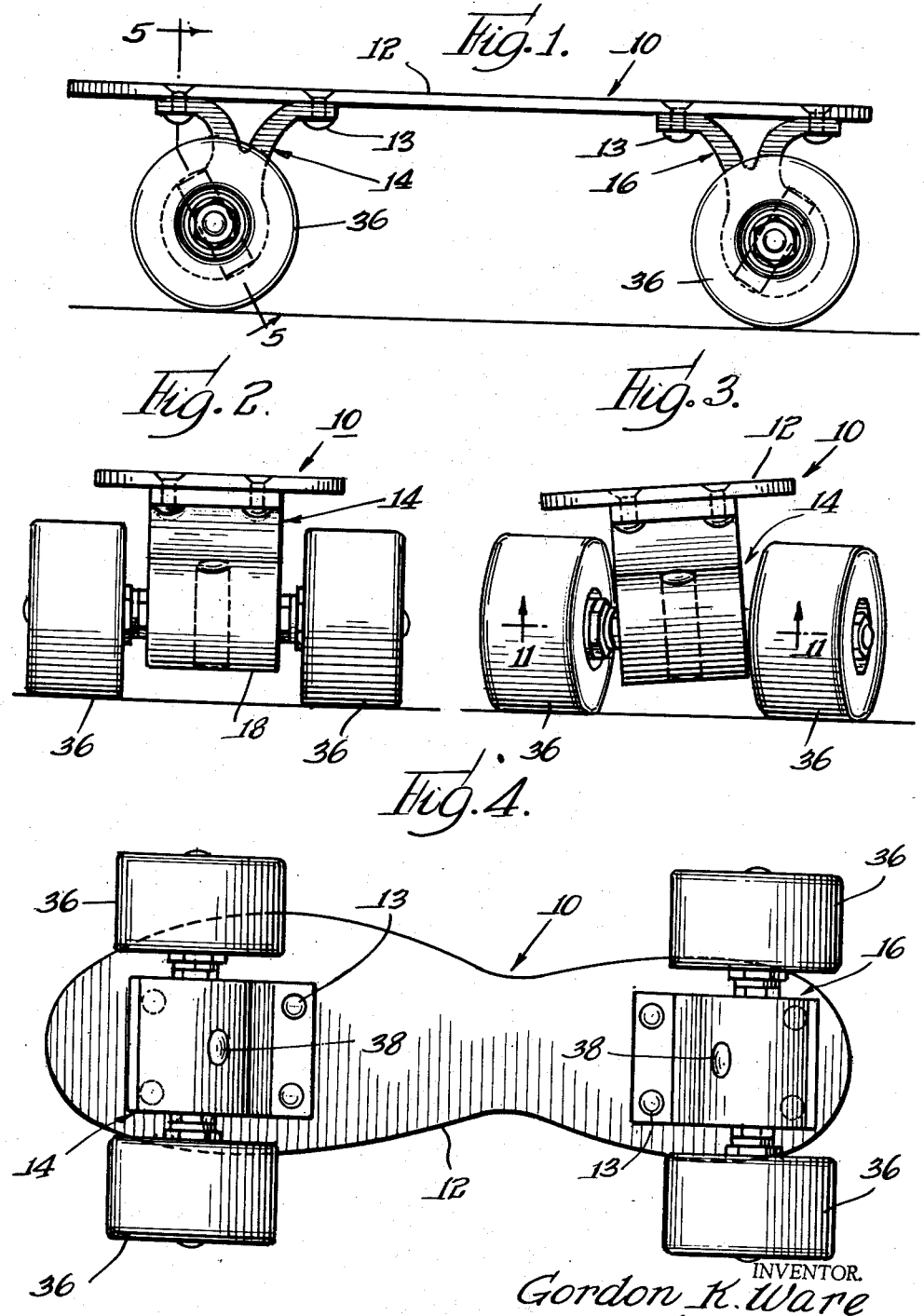
INVENTOR.
Gordon K. Ware
BY Olson, Trexler
Wolters & Bushnell
Attys.

April 30, 1963
G. K. WARE
3,087,739
ROLLER SKATE STRUCTURE
Filed April 18, 1961
2 Sheets-Sheet 2
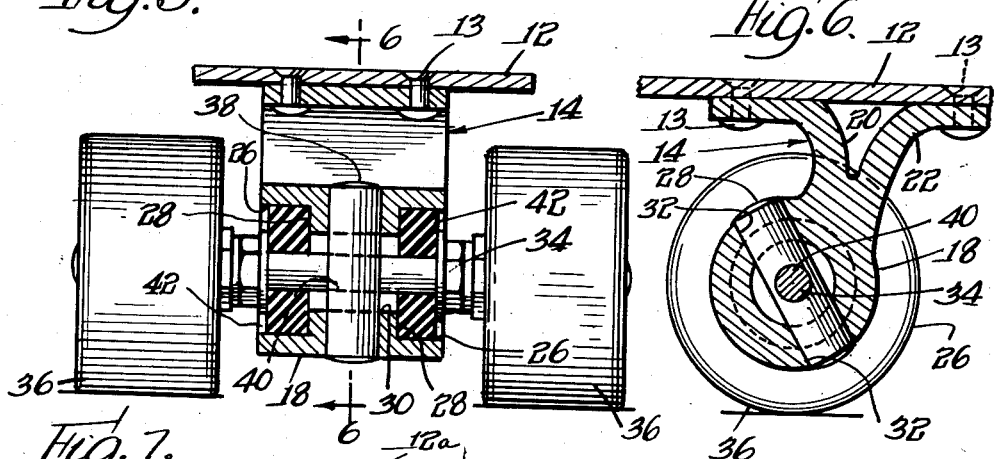
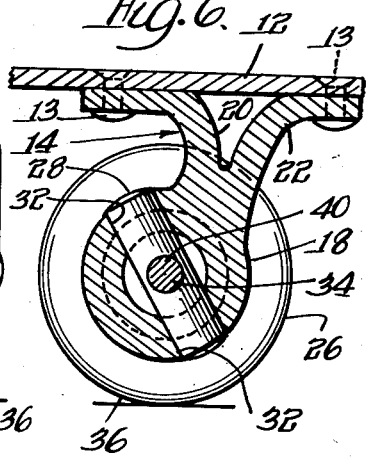
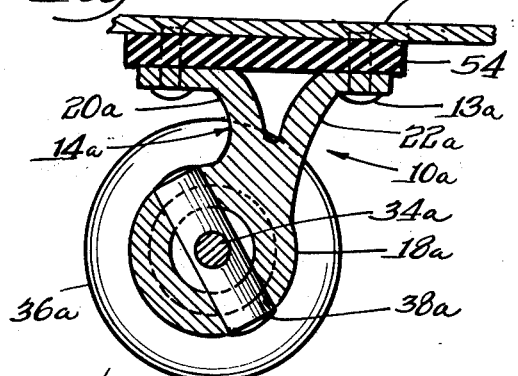
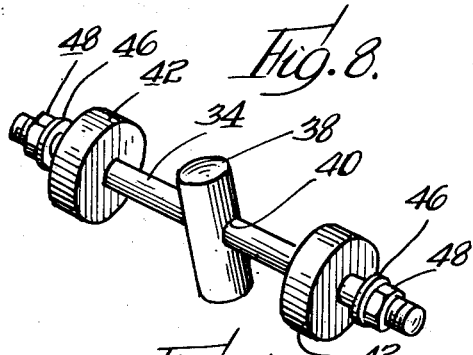
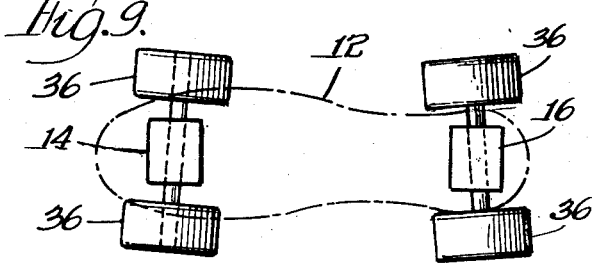
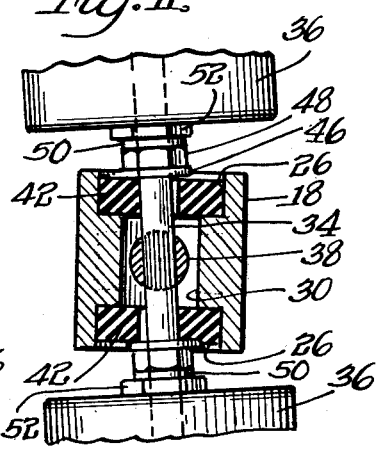
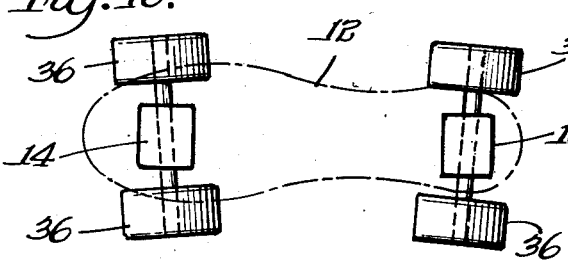
INVENTOR.
Gordon K. Ware
BY Olson, Trexler
Wolters & Bushnell
Attys.

United States Patent Office 3,087,739
Patented Apr. 30, 1963

3,087,739
ROLLER SKATE STRUCTURE
Gordon K. Ware, Chicago, Ill., assignor to Chicago Roller Skate Company, Chicago, Ill., a corporation of Illinois
Filed Apr. 18, 1961, Ser. No. 103,779
10 Claims. (Cl. 280—11.28)

This invention relates to roller skates of the type wherein yieldable cushioning supports are provided for the wheels, and it has particular reference to a shiftable roller skate axle and the cushioning and guide means therefor.

The present invention is directed to a roller skate of the type wherein a degree of flexibility is provided between the wheel axles and the main skate frame so that within limits the wheel axles may shift and twist to facilitate turning of the skate upon application of an appropriate turning force and to facilitate the return of the wheel axles to the normal or forward position upon removal of the turning force. This turning of the wheel axles with respect to the skate frame is accomplished by tilting the frame to one side or the other while retaining the skate wheels firmly upon the supporting surface. The cushioning members are subjected to compression forces and bending forces in addition to torsional forces when the wheel axles are turned with respect to the wheel truck. Further, the cushioning members must withstand the normal compression forces due to the weight of the skater and should provide a degree of resilience between the skate frame and the wheel axle as the skate wheels engage the floor or other support surface whereby to greatly reduce contact shocks and to enhance the "feel" of the skate.

Difficulty has been encountered in attempting to provide a skate of the foregoing type having an arrangement for a cushioned axle which will permit the desired degree of freedom for movement of the wheel axle and at the same time afford a desired degree of resilient support. In prior cushioned axle constructions, the pivotal and deflection movements of the axle were not guided sufficiently to limit the turning and twisting motion of the wheel axle only to selected predetermined planes. Further, the mounting of the cushioning member, perforce, was discrete from the mounting of the axle thereby requiring a separate support means for the cushioning member.

It is accordingly, an important object of this invention to provide a roller skate having an improved wheel axle guiding and cushioning arrangement which will permit the desired movement and combination of movements between the wheel axle and the skate body while providing the body with a firm axle support and affording a smooth skating action.

Another object of the present invention is to provide an improved cushioned mounting for a roller skate wheel axle, which mounting provides for positively guiding the movement of the wheel axle in predetermined planes.

Yet another object of the present invention is to provide in roller skates of the type described, a mounting for the wheel trucks which effectively dampens and absorbs the vibration generated by the skate wheels engaging a rough surface, thereby insulating such vibration from the skater's foot.

A further object of this invention is to provide in roller skates of the type described, an improved mounting and cushioning arrangement for the wheel axle which is simple in design and construction, highly practical in use, and which is adapted to provide a predetermined degree of freedom for movement of the wheel axle while affording a smooth action and "feel."

Various other objects, advantages and features of the invention will be apparent from the following specification when taken in connection with the accompanying drawings wherein certain preferred embodiments are set forth for purposes of illustration.

In the drawings, wherein like reference numerals refer to like parts throughout:

FIGURE 1 is a side elevational view of a roller skate in accordance with and embodying the principles of the present invention, in accordance with one selected embodiment thereof;

FIG. 2 is an elevational view of an end of the roller skate shown in FIG. 1;

FIG. 3 is a view similar to FIG. 2 of the end of the roller skate, the skate being illustrated in the position for turning with the sole tilted and the wheels turned;

FIG. 4 is a bottom view of the roller skate shown in FIG. 1;

FIG. 5 is an enlarged, transverse, vertical sectional view taken in the direction of the arrows along the line 5—5 in FIG. 1, the wheels being shown in elevation for the purpose of clarity.

FIG. 6 is a longitudinal, vertical sectional view taken in the direction of the arrows along the line 6—6 in FIG. 5;

FIG. 7 is a longitudinal sectional view, similar to FIG. 6, showing a second embodiment of the present invention, wherein a rubber-like pad is employed to lend increased resiliency;

FIG. 8 is an enlarged perspective view of the wheel axle and cushioning members detached from the adjacent skate structure;

FIG. 9 is a reduced plan view showing diagrammatically the position of the skate wheels and supporting axles when the skate is subjected to a right hand turn;

FIG. 10 is a reduced, plan view, similar to FIG. 9, showing the position of the skate wheels and axles when the skate is subjected to a left hand turn; and FIG. 11 is an enlarged, transverse, horizontal sectional view taken in the direction of the arrows along the line 11—11 in FIG. 3, the wheels being shown in elevation.

Referring to the drawings and first to the embodiment illustrated in FIGS. 1-6, in FIG. 1 there is illustrated a roller skate structure generally designated by the numeral 10 made in accordance with and embodying the principles of the present invention. The roller skate 10 includes a sole plate or frame 12, having attached thereto by any suitable means such as rivets 13, a front truck 14 and a rear truck 16. The front truck 14 and the rear truck 16 are preferably similar in character and accordingly only one, the truck 14, will be described in detail.

The truck 14 includes a hollow, sleeve-like housing 18 having a pair of bracket arms 20 and 22 integrally formed thereon at the upper portion thereof. The bracket arms 20 and 22 extend upwardly from the housing 18 in diverging directions and are fixedly secured at the free end portions thereof to the sole plate or frame 12 by the rivets 13. Referring more particularly to the housing 18, the opposite vertically disposed ends of the housing 18 are provided with cylindrical, socket-like openings 26, the inward extent of each socket 26 being defined by an annular shoulder 28. To provide communication through the housing 18 between the sockets 26, a passageway 30 is provided centrally arranged within the housing 18 and disposed coaxially with the sockets 26. A cylindrical bore 32 extends radially through the walls of the housing 18 and in communication with the passageway 30, the longitudinal axis of the bore 32 being arranged perpendicular to that of the passageway 30. As depicted in FIG. 6 in vertical cross section, the bore 32 is displaced from the vertical at an acute angle of about 30 to 45 degress, the axis of the bore 32 being inclined forwardly along the longitudinal axis of the sole plate 12 (see FIG. 4) and on the front truck 14 extends in the direction of forward skating motion and rearwardly on the rear truck 16 in the direction of backward skating motion.

An axle 34, having wheels 36 rotatably mounted on the opposite ends thereof, is supported in the housing 18 for guided pivotal movements with respect thereto. More specifically, the axle 34, an elongated cylindrical member, extends entirely through the housing 18. At its mid-portion, the axle 34 is embraced by a cylindrical guide pin 38 which is mounted for sliding and rotational movements in the bore 32. The guide pin 38 is provided with a hole 40 midway along its length of a size adapted to accommodate the axle 34. To effect a tight, permanent fit between the guide pin 38 and the axle 34, the mid portion of the axle 34 may be provided with a raised, roughened surface, such as knurling, for firmly engaging the wall defiing the hole 40 in the pin 38 when pressed therein. Thus, the guide pin 38 and the axle 34 move together as a unit, and it being that the guide pin 38 is mounted for easy rotation and sliding movement in the bore 32, a wide combination of pivotal and guided vertical movements of the axle 34 is possible.

To cushion and resiliently support the axle 34 and yet allow a predetermined degree of movement therefor, a pair of yieldable, plastic or rubber-like cushioning elements 42 are provided on the truck 14. More particularly, each cushioning element 42 has a short cylindrical shape of a size adapted snugly to fit into the socket 26 and to abut the annular shoulder 28. Each cushioning element 42 is provided with a central hole of a size adapted to receive tightly the axle 34 therethrough. Thus, it is seen that the axle 34 is firmly embraced by the cushioning elements 42 at two spaced apart points along its length and thereby is resiliently constrained for movement with respect to the housing 18. The cushioning elements 42 being made of rubber or plastic material which possesses the desired resiliency and yieldability, the axle 34 is supported in the housing 18 so that to a substantial extent, shock and other vibrations are absorbed within the cushioning element 42 and are not transmitted into the skate sole plate or body 12.

Referring to FIG. 11, a washer 46 urged by a nut 48 provides a shoulder for engaging the outwardly disposed face of each cushioning element 42 to limit outward movement thereof and to positively locate the element 42 with respect to the axle 34 and the housing 18.

In assembly, the guide pin 38 is slidably inserted into the bore 32 a distance whereby the hole 40 therein is in communication with the passageway 30 of the housing 18. The axle 34 is then inserted through the passageway 30 into the hole 40 until the knurled central portion is securely seated in the guide pin 38. Next, a cushioning element 42 is fitted over each end portion of the axle 34 and is urged therealong into the respective socket 26 to engage the annular shoulder 28. The washer 46 is then applied over each end portion of the axle 34 and is urged into firm engagement with the adjacent face of the cushioning element 42 by the nut 48. Thereafter the wheels 36 are secured to axle 34 in the usual manner, there being shown in the drawings a washer 50 engaging the nut 48 and a jam nut 52 disposed outwardly of the washer 50, best shown in FIGS. 5 and 11.

When the roller skate 10 is in use, the cushioning elements 42 will be subjected to constant compressive forces and must therefore be capable of withstanding such forces. Any shock or vibration which tends to be transmitted from the supporting surface to the wheels 36 and then to the skate body 10, must also be absorbed by the cushioning elements 42. Hence, the cushioning elements 42 must possess a certain degree of resiliency so as to insulate such vibrations from the housing 18. When the axle 34 and guide pin 38 are turned with respect to the housing 18, the cushioning elements 42 are subjected to a combination of compressive bending and torsional forces.

Referring particularly to FIGS. 3 and 9, to turn to the right, the skater first leans the skate sole plate 12 to the right thereby compressing the lower portion of the right-hand cushioning elements 42 and the upper portion of the left-hand cushioning elements 42. Immediately upon tilting the skate frame or sole plate 12 to the right, the front axle 34 will pivot in a right-hand or clockwise direction with respect to the housing 18 and the rear axle will pivot oppositely to the front axle thereby twisting the cushioning elements 42 a predetermined degree. When the skater wishes to proceed in a forward direction again, the sole plate 12 is placed in a level position with respect to the skating surface, and at this time is is desirable that the axle 34 be returned immediately to the forward or neutral position as seen in FIG. 4. The forces built up in the cushioning elements 42 by the pivoting of the axle 34 described above will aid in returning the axle 34 to the neutral position provided that the cushioning elements 42 have not been displaced with respect to the walls defining the socket 26. For this reason, the washer 46 and nut 48 are provided to maintain the cushioning element 42 in the respectively associated socket 26.

Similarly, to turn the skate to the left as seen in FIG. 10, the skater first leans the sole plate 12 to the left thereby compressing the cushioning elements 42 in the opposite direction as that previously described. When desiring to proceed in a forward direction again, the skater merely places the skate sole plate 12 in a level or parallel position with respect to the skating surface whereupon the wheel axle 34 returns immediately to the forward or neutral position.

There is illustrated in FIG. 7, a second form of skate structure generally designated by the numeral 10a made in accordance with and embodying the principles of the present invention. This skate structure 10a includes a sole plate 12a and a truck 14a. It is to be appreciated that the truck 14a is of a similar construction and arrangement to the truck 14 previously described in the first embodiment of this invention and hence, the several parts of the truck 14a will not be further described but will be designated by the suffix letter "a" applied to the numerals which designate respective corresponding parts.

To provide optimum insulation of the skate frame 12a from vibration and shock and to afford an added degree of cushioning therefor, a buffer member 54 is interposed between the truck 14a and the frame 12a. More specifically, the buffer member 54 is composed of a rubber or plastic material which possesses the desired resiliency and yieldability to withstand a constant compressive force to absorb any shocks transmitted thereto from the skating surface through the wheel 36a. Having the form of a rectangular pad, the buffer member 54 is preferably made from a flat sheet of rubber material having the desired thickness to provide the requisite amount of insulation and may be of such a size as to bridge between the opposing end portions of the bracket arms 20a and 22a thereby insuring a firm base for attachment of the member 54 to the truck 14a and to the frame 12a. Further, the buffer member 54 and the end portions of the bracket arms 20a and 22a are secured to the sole plate 12a by suitable rivets 13a.

The form of the skate shown in FIG. 7 can partake of all the motions described above with respect to the embodiment shown in FIGS. 1–6, and FIGS. 8–11. Therefore, the cushioning elements 42a will be subjected to the same type of forces and must meet the same requirements as the cushioning elements 42. More specifically, the cushioning element constitutes the limiting factor as the axle is twisted and turned, and further, substantially all shocks and vibrations are resisted and absorbed by the buffer element 54 and the cushioning elements 42a.

It is obvious that various changes may be made in the

This invention is hereby claimed as follows:

1. A roller skate construction comprising a body adapted to be secured to a skater's shoe, a wheel truck fixedly secured to said body, an axle having a pair of wheels rotatably mounted thereon, a guide member pivotally interconnecting said axle with said wheel truck and mounted for pivotal movement and linear sliding movements with respect to said truck toward and away from said body, said axle extending through and being fixed to said guide member, and cushioning means engaging said axle and said wheel truck resiliently to limit the pivotal movements of said axle and the movements of said guide member toward and away from said body, and means on said axle inwardly of said wheels and engaging said cushioning means for limiting axial movement of said axle.

2. The roller skate set forth in claim 1, wherein said axle pivots about an axis inclined with respect to said body in the direction of movement of said guide member.

3. A roller skate construction comprising a body adapted to be secured to a skater's shoe, a wheel truck fixedly secured to said body, an axle having a pair of wheels rotatably mounted thereon, a guide member pivotally interconnecting said axle with said wheel truck and mounted for movements toward and away from said body, said wheel truck having a pair of recesses therein through which said axle extends, a pair of resiliently yieldable cushioning members disposed in said recesses and embracing portions of said axle disposed outwardly of said guide member, whereby said cushioning members provide a resilient constraint for movements of said axle with respect to said wheel truck, and annular shoulder means fixed at inner ends of said recesses and extending into radially overlapping relationship with and axially abutting said cushioning members for restraining said cushioning members against axial movement.

4. A roller skate construction comprising a body adapted to be secured to a skater's shoe, a wheel truck fixedly secured to said body, an axle having a pair of wheels rotatably mounted thereon, a guide member pivotally interconnecting said axle with said wheel truck and mounted for linear sliding movements with respect to said truck toward and away from said body, said wheel truck having a pair of recesses therein through which said axle extends, said axle also extending through and being fixed to said guide member, a pair of resiliently yieldable cushioning members disposed in said recesses and embracing portions of said axle disposed outwardly of said guide member, whereby said cushioning members provide a resilient constraint for movements of said axle with respect to said wheel truck, and means on said axle inwardly of said wheels and engageable with said cushion members for limiting axial movement of said axle.

5. A roller skate construction comprising a body adapted to be secured to a skater's shoe, a wheel truck on said body, an axle having a pair of wheels rotatably mounted thereon, a guide member pivotally interconnecting said axle with said wheel truck and mounted for movements toward and away from said body, said wheel truck having a pair of recesses therein through which said axle extends, a pair of resiliently yieldable cushioning members disposed in said recesses and embracing portions of said axle disposed outwardly of said guide member, and shoulder means respectively in said recesses and on said axle and extending into radially overlapping relationship with and axially engaging opposite ends of each cushioning member for positively locating said members with respect to said axle and said wheel truck, whereby said cushioning members provide a resilient constraint for movements of said axle with respect to said wheel truck.

6. A roller skate construction comprising a body adapted to be secured to a skater's shoe, a wheel truck fixedly secured to said body, an axle having a pair of wheels rotatably mounted thereon, a guide member pivotally interconnecting said axle with said wheel truck and mounted for linear sliding movements with respect to said truck toward and away from said body, said wheel truck having a pair of recesses therein through which said axle extends, a pair of resiliently yieldable cushioning members disposed in said recesses and embracing portions of said axle disposed outwardly of said guide member, and shoulder means respectively on said truck and on said axle and extending into radially overlapping relationship with and axially engaging opposite ends of each cushioning member for positively locating said member with respect to said axle and said wheel truck, whereby said cushioning members provide a resilient constraint for movements of said axle with respect to said wheel truck.

7. In a roller skate construction adapted to facilitate smoothly executed turning movements over a skating surface and providing easy transition from curved to linear skating paths, the combination comprising: a body adapted to be secured to a skater's shoe; a wheel truck fixedly secured to said body and including an axle housing extending generally parallel to the skating surface, said axle housing having a bore stepped inwardly from each end toward a hollow central portion of said housing; an axle shaft extending through said bore and having a wheel rotatably mounted at each end thereof, said axle shaft having means at a medial portion thereof coacting with said central portion of said housing for permitting controlled pivotal and vertically displacing movement of said axle when said skate negotiates a curved path; yieldable resilient cushioning members mounted in said stepped portions of said bore in a yielding supporting relationship with said axle shaft to provide reaction pressure for returning said shaft to its original position upon transition from a curved to a linear skating path.

8. In a roller skate construction adapted to facilitate smoothly executed turning movements over a skating surface and providing easy transition from curved to linear skating paths, the combination comprising: a body adapted to be secured to a skater's shoe; a wheel truck fixedly secured to said body and including an axle housing extending generally parallel to the skating surface and at a right angle to the longitudinal axis of said body, said axle housing having a throughbore communicating with socket-like recesses on each end of said housing; an axle shaft extending through said recesses and said bore and having a wheel rotatably mounted at each end thereof; a yieldable resilient cushioning member seated in each of said recesses embracingly supporting said axle at two axially spaced positions in said housing adjacent each end of said bore; said axle housing having an aligned pair of apertures in opposite wall portions thereof communicating with said bore; and a guide pin rigid with said axle rotatably and axially slidably disposed in said apertures, said axle being pivotable in said bore about the axis of said pin against the constraint of said cushioning members for executing turning movement over a skating surface, the constraining pressures from said cushioning members urging said axle toward said original position upon transition from a curved to a linear skating path.

9. A roller skate construction comprising a body adapted to be secured to a skater's shoe; a wheel truck including a hollow housing secured to said body; an axle shaft extending through said hollow housing and having a pair of wheels rotatably mounted thereon; a guide pin rigid with a medial portion of said axle and slidably mounted in said housing for accommodating vertical and pivotal displacements of said axle with respect to said housing; a resiliently yieldable cushioning member disposed at each end of said housing in supporting relationship with said axle shaft; and annular shoulder means within said housing on each side of said pin and projecting into radially overlapping relationship with and axially abutting each of said cushioning members to limit movement thereof along said axle shaft toward and away from said guide pin.

10. A roller skate construction comprising a body adapted to be secured to a skater's shoe; a wheel truck associated with each end of said body and including an axle housing extending generally parallel to a skating surface and at a right angle to the longitudinal axis of said body, said axle housing have a bore stepped inwardly from each end toward a hollow central portion of said housing; an axle shaft extending through said bore and having a wheel rotatably mounted at each end thereof, said axle shaft having means at a medial portion thereof coacting with said central portion of said housing for permitting controlled pivotal and vertically displacing movements of said axle when said skate negotiates a curved path; a vibration dampening suspension system interposed between said axle said wheel truck and said body for mollifying shocks to said wheels from the skating surface, said suspension system including a pair of yieldable resilient cushioning members mounted in said stepped portions of said bore in yielding supporting relationship with said axle shaft and arranged to intercept and attentuate the transmission of vibrations of a first order from said wheels and said axle shaft to said housing, and a yieldable resilient block of cushioning material interposed between each wheel truck and said body and coacting with said cushioning members to intercept and attenuate the transmission of vibrations of a second and lesser order from said wheel truck to said body.

References Cited in the file of this patent
UNITED STATES PATENTS

| | | |
|---|---|---|
| 1,406,641 | Hardy | Feb. 14, 1922 |
| 2,039,153 | Edwards | Apr. 28, 1936 |
| 2,086,557 | Kaptuller | July 13, 1937 |
| 2,330,147 | Rodriguez | Sept. 21, 1943 |
| 2,466,070 | Balstad | Apr. 5, 1949 |
| 2,540,847 | Thorson | Feb. 6, 1951 |

FOREIGN PATENTS

| | | |
|---|---|---|
| 805,376 | Germany | May 17, 1951 |